United States Patent [19]
Brown

[11] Patent Number: 6,145,863
[45] Date of Patent: Nov. 14, 2000

[54] LOG TRAILER

[76] Inventor: Luther D. Brown, P.O. Box 24, Puckett, Miss. 39151

[21] Appl. No.: 09/213,122

[22] Filed: Dec. 17, 1998

[51] Int. Cl.[7] ...................................................... B60P 3/41
[52] U.S. Cl. ........................ 280/404; 280/145; 280/763.1
[58] Field of Search ..................................... 280/404, 143, 280/400, 145, 144, 766.1, 763.1

[56] References Cited

U.S. PATENT DOCUMENTS

| | | | |
|---|---|---|---|
| 1,025,714 | 5/1912 | Paine | 280/404 |
| 1,287,468 | 12/1918 | Shadbolt | 280/404 |
| 1,630,425 | 5/1927 | Hartwick | 280/404 |
| 2,032,721 | 3/1936 | Schaefer | 280/404 |
| 3,070,386 | 12/1962 | Gregg | 280/404 |
| 3,356,387 | 12/1967 | Skirvin et al. | 280/404 |
| 3,545,635 | 12/1970 | Montan | 280/404 X |
| 3,873,129 | 3/1975 | Schmidt | 280/404 |
| 4,188,042 | 2/1980 | Pederson et al. | 280/404 |
| 4,362,451 | 12/1982 | Thiermann, Sr. | 280/404 |

FOREIGN PATENT DOCUMENTS 705343  5/1941  Germany ................ 280/404

*Primary Examiner*—J. J. Swann
*Assistant Examiner*—F. Zeender

[57] ABSTRACT

A log trailer for carrying logs thereon. The log trailer includes an elongate main pole with a front cradle coupled thereto towards a front end of the main pole. A generally open rectangular rear support frame is coupled to the main pole adjacent a back end of the main pole. A rear cradle with spaced apart front and back bolsters is pivotally coupled to the rear support frame.

14 Claims, 4 Drawing Sheets

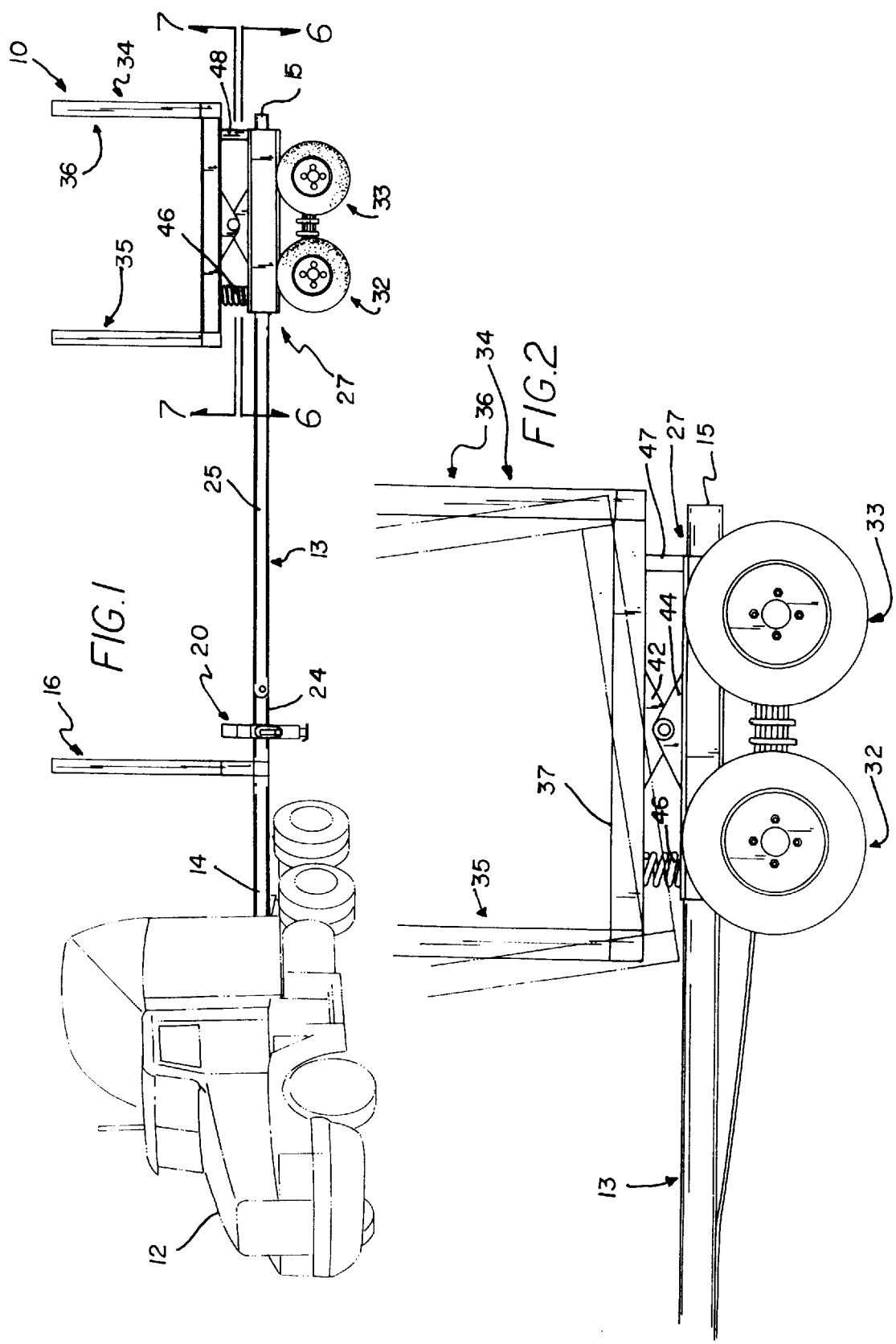

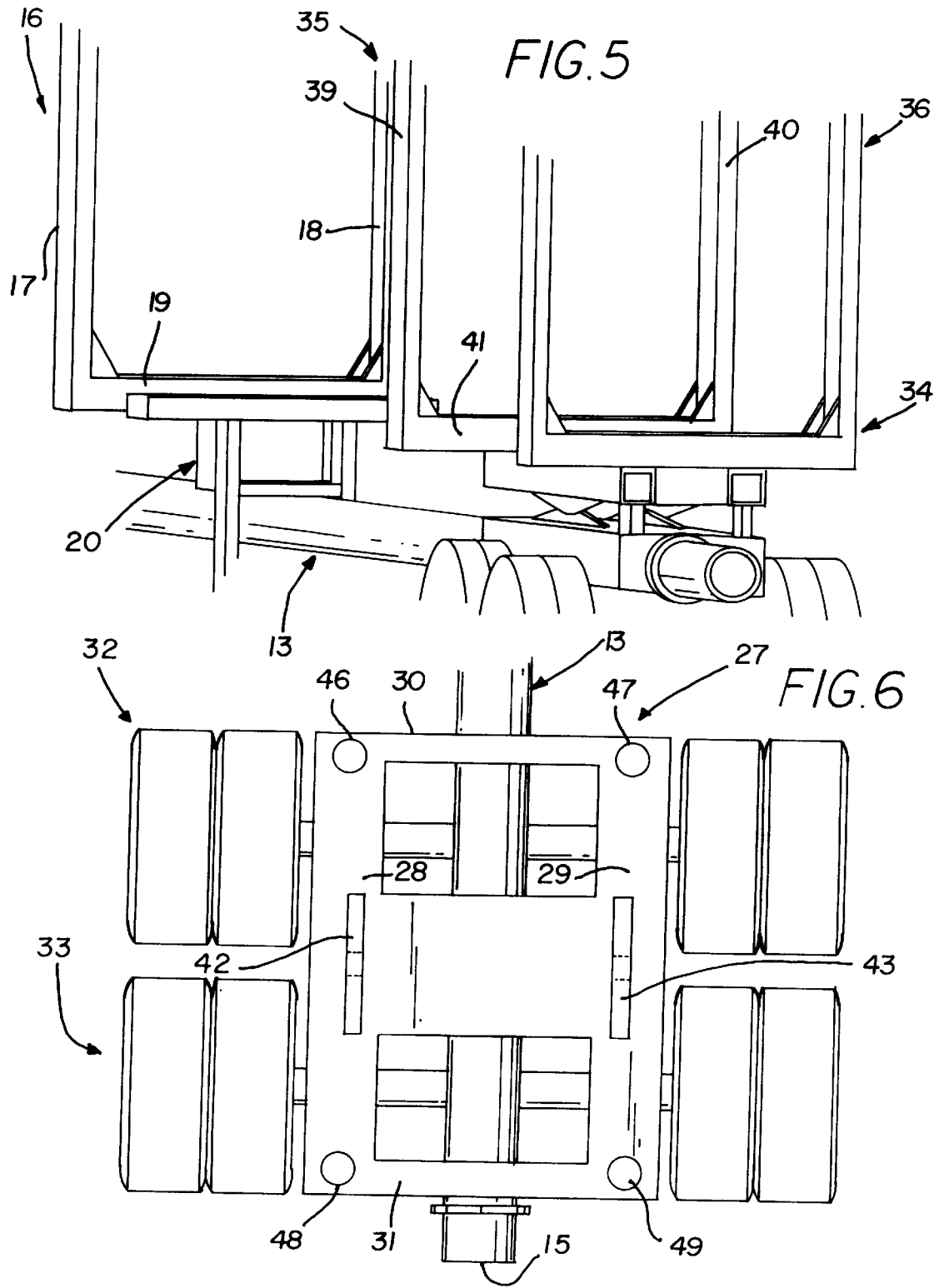

LOG TRAILER

BACKGROUND OF THE INVENTION

1. Field of the Invention

The present invention relates to log trailers and more particularly pertains to a new log trailer for carrying logs thereon.

2. Description of the Prior Art

The use of log trailers is known in the prior art. More specifically, log trailers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,439,934 by Murier, Jr. et al.; U.S. Pat. No. 3,232,636 by Buchanan et al.; U.S. Pat. No. 4,188,042 by Pederson et al.; U.S. Pat. No. 2,551,904 by Robertson; U.S. Pat. No. 2,089,815 by Rogers; and U.S. Pat. No. Des. 337,970 by Ryan.

While these devices fulfill their respective, particular objectives and requirements, the aforementioned patents do not disclose a new log trailer. The inventive device includes an elongate main pole with a front cradle coupled thereto towards a front end of the main pole. A generally open rectangular rear support frame is coupled to the main pole adjacent a back end of the main pole. A rear cradle with spaced apart front and back bolsters is pivotally coupled to the rear support frame.

In these respects, the log trailer according to the present invention substantially departs from the conventional concepts and designs of the prior art, and in so doing provides an apparatus primarily developed for the purpose of carrying logs thereon.

SUMMARY OF THE INVENTION

In view of the foregoing disadvantages inherent in the known types of log trailers now present in the prior art, the present invention provides a new log trailer construction wherein the same can be utilized for carrying logs thereon.

The general purpose of the present invention, which will be described subsequently in greater detail, is to provide a new log trailer apparatus and method which has many of the advantages of the log trailers mentioned heretofore and many novel features that result in a new log trailer which is not anticipated, rendered obvious, suggested, or even implied by any of the prior art log trailers, either alone or in any combination thereof.

To attain this, the present invention generally comprises an elongate main pole with a front cradle coupled thereto towards a front end of the main pole. A generally open rectangular rear support frame is coupled to the main pole adjacent a back end of the main pole. A rear cradle with spaced apart front and back bolsters is pivotally coupled to the rear support frame.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new log trailer apparatus and method which has many of the advantages of the log trailers mentioned heretofore and many novel features that result in a new log trailer which is not anticipated, rendered obvious, suggested, or even implied by any of the prior art log trailers, either alone or in any combination thereof.

It is another object of the present invention to provide a new log trailer which may be easily and efficiently manufactured and marketed.

It is a further object of the present invention to provide a new log trailer which is of a durable and reliable construction.

An even further object of the present invention is to provide a new log trailer which is susceptible of a low cost of manufacture with regard to both materials and labor, and which accordingly is then susceptible of low prices of sale to the consuming public, thereby making such log trailer economically available to the buying public.

Still yet another object of the present invention is to provide a new log trailer which provides in the apparatuses and methods of the prior art some of the advantages thereof, while simultaneously overcoming some of the disadvantages normally associated therewith.

Still another object of the present invention is to provide a new log trailer for carrying logs thereon.

Yet another object of the present invention is to provide a new log trailer which includes an elongate main pole with a front cradle coupled thereto towards a front end of the main pole. A generally open rectangular rear support frame is coupled to the main pole adjacent a back end of the main pole. A rear cradle with spaced apart front and back bolsters is pivotally coupled to the rear support frame.

Still yet another object of the present invention is to provide a new log trailer that allows a heavy load of logs (between 4000 and 5000 lbs.) typically requiring a traditional double beamed log trailer to be supported on a single pole trailer by having a rear cradle that pivots to balance the weight of the logs on the rear cradle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new log trailer according to the present invention.

FIG. 2 is a schematic side view of the back end of the present invention.

FIG. 5 is a schematic perspective view from the back end of the present invention.

FIG. 6 is a schematic cross sectional view of the rear support frame taken from the vantage of line 6—6 of FIG. 1 of the present invention.

DESCRIPTION OF THE PREFERRED EMBODIMENT

Figure 3:
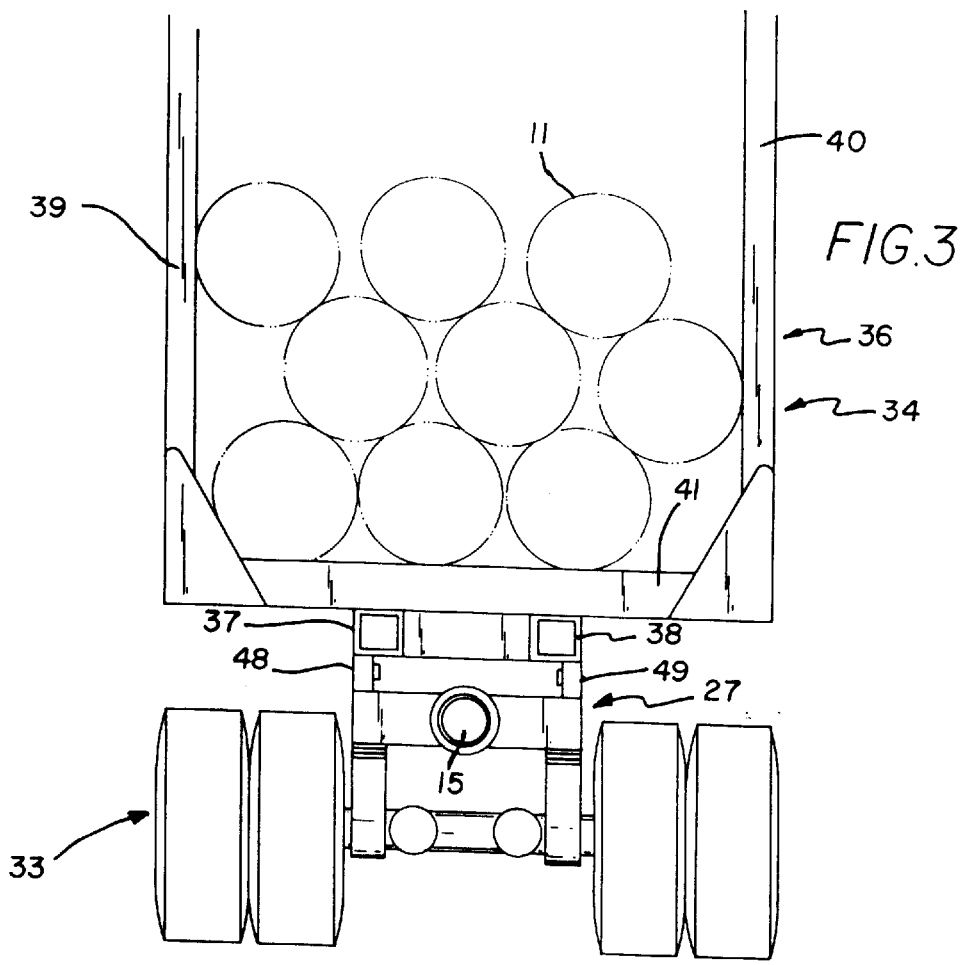
FIG. 3 is a schematic back end view of the present invention.
Figure 4:
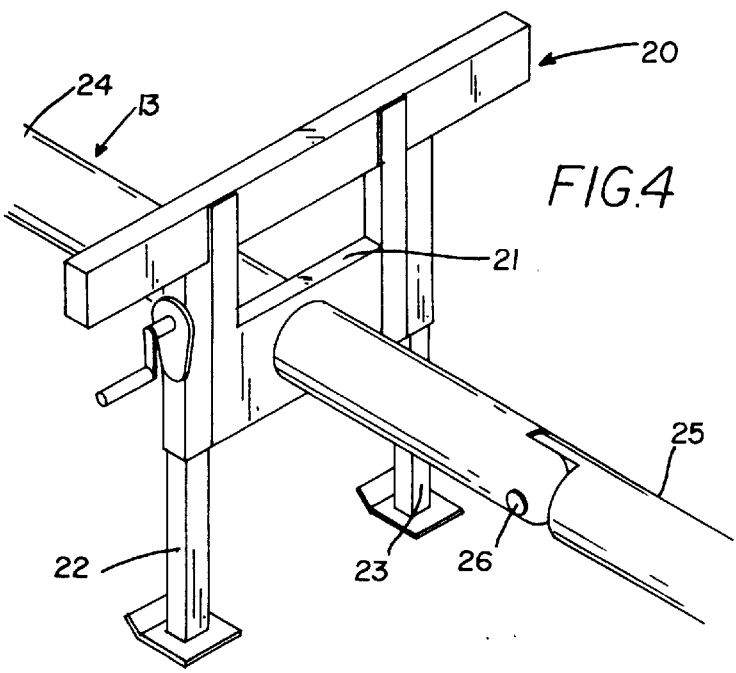
FIG. 4 is a schematic perspective view of the leg stand of the present invention.
Figure 7:
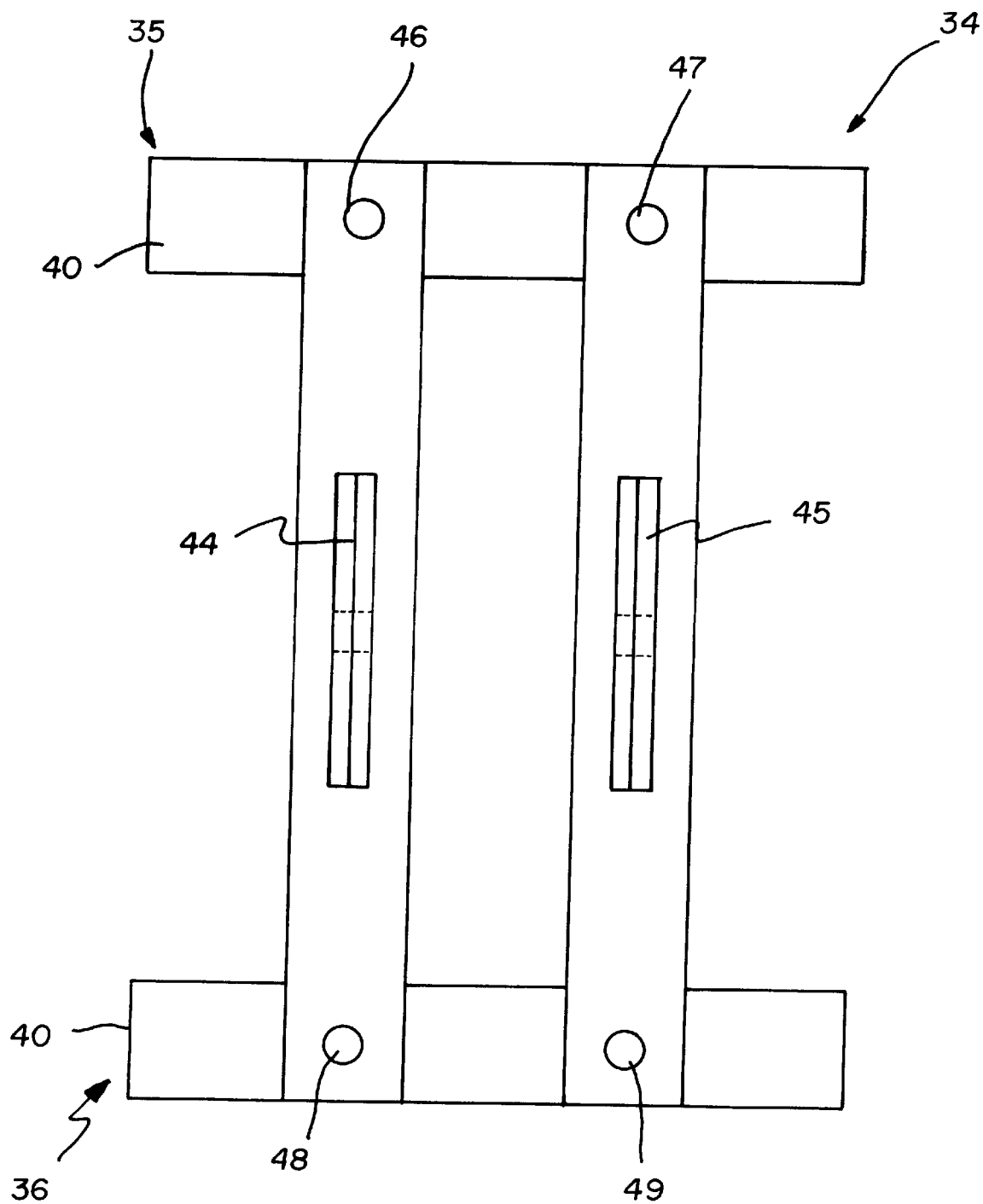
FIG. 7 is a schematic cross sectional view of the rear cradle of the present invention taken from the vantage of line 7—7 of FIG. 1.

With reference now to the drawings, and in particular to FIGS. 1 through 7 thereof, a new log trailer embodying the principles and concepts of the present invention and generally designated by the reference numeral 10 will be described.

As best illustrated in FIGS. 1 through 7, the log trailer 10 generally comprises an elongate main pole with a front cradle coupled thereto towards a front end of the main pole. A generally open rectangular rear support frame is coupled to the main pole adjacent a back end of the main pole. A rear cradle with spaced apart front and back bolsters is pivotally coupled to the rear support frame.

In closer detail, the trailer 10 is designed for carrying logs 11 thereon and being towed by a tow vehicle 12 and includes a generally horizontally extending elongate main pole 13 having opposite front and back ends 14,15, and a longitudinal axis extending between the front and back ends of the main pole. The main pole preferably has a generally circular transverse cross section taken substantially perpendicular to the longitudinal axis of the main pole. The front end of the main pole has a tongue designed for attachment to a hitch of a towing vehicle.

A generally rectangular U-shaped front cradle 16 is coupled to the main pole towards the front end of the main pole. The front cradle has a spaced apart pair of generally vertically extending elongate upper side members 17,18 and an generally horizontal extending elongate lower cross 19 member connecting the upper side members of the front cradle together. The lower cross member of the front cradle is coupled to the main pole so that the lower cross member of the front cradle is extended substantially perpendicular to the longitudinal axis of the main pole. The upper side members of the front cradle are extended substantially parallel to one another and substantially perpendicular to the lower cross member of the front cradle. In use, the front cradle is designed for holding logs therein with the logs is stacked on the lower cross member of the front cradle between the upper side members of the front cradle.

Preferably, a retractable leg stand 20 is coupled to the main pole adjacent the front cradle such that the front cradle is interposed between the leg stand and the front end of the main pole. The leg stand has a generally horizontally extending elongate upper support member 21 and a spaced apart pair of generally vertically extending retractable legs 22,23 downwardly depending from the upper support member of the leg stand. The upper support member of the leg stand is extended substantially perpendicular to the longitudinal axis of the main pole. Preferably, the upper support member of the leg stand and the lower cross member of the front cradle generally lie in a common horizontal plane with one another. The legs of the leg stand are extended substantially parallel to one another and substantially perpendicular to the upper support member of the leg stand with the main pole interposed between the legs of the leg stand. In use, the legs of the legs stand are retractably extendable to rest on a ground surface below the main pole to support the front end of the main pole above the ground surface when the front end of the main pole is unhitched from a towing vehicle.

In a preferred embodiment, the main pole has front and back portions 24,25. The front portion of the main pole is positioned adjacent the front end of the main pole and the back portion of the main pole is positioned adjacent the back end of the main pole. The front and back portions of the main pole are pivotally coupled together at a pivot point 26 adjacent the leg stand such that the leg stand and the front cradle are interposed between the pivot point and the front end of the main pole. In use, the front and back portions of the main pole are pivotable at the pivot point about a first pivot axis extending substantially perpendicular to the longitudinal axis of the main pole between an extended positioned and a folded position. When positioned in the extended position, the front and back portions of the main portion are substantially collinear. When positioned in the folded position, the front and back portions of the main portion are extended at an angle less than about 180 degrees for permitting lifting and lowering of the front portion of the main pole to detach and attach the tongue of the pole to a towing vehicle.

A generally open rectangular rear support frame 27 is coupled to the main pole adjacent the back end of the main pole. The rear support frame has a spaced apart pair of substantially parallel side beams 28,29 and a spaced apart front and back cross braces 30,31 extending between the side beams of the rear support frame to connect the side beams of the rear support frame together. The cross braces of the rear support frame are coupled to the main pole with the front cross brace of the rear support frame positioned towards the front end of the main pole and the back cross brace of the rear support frame positioned towards the back end of the main post. The side beams of the rear support frame are extended substantially parallel to the longitudinal axis of the main pole. First and second sets of ground engaging wheels 32,33 are rotatably mounted by axles and appropriate trailer suspension to the rear support frame to support the main pole above a ground surface.

A rear cradle 34 is pivotally coupled to the rear support frame. The rear cradle has spaced apart front and back bolsters 35,36 and a spaced apart pair of substantially parallel elongate support beams 37,38 extending between the front and back bolsters of the rear cradle to connect the front and back bolsters of the rear cradle together. The front and back bolsters of the rear cradle each comprise a space apart pair of generally vertically extending elongate upper side posts 39,40 and a generally horizontally extending elongate lower cross post 41 extending between the associated upper side posts of the respective bolster to connect the associated upper side posts together. The lower cross posts of the front and back bolsters each are coupled to the support beams of the rear cradle with the lower cross posts of the front and back bolsters extending substantially perpendicular to the longitudinal axis of the main pole. The upper side posts of the front and back bolsters are extended substantially parallel to one another and substantially perpendicular to the associated lower cross post of the respective bolster. In use, the bolsters of the rear cradle are designed for holding logs therein with the logs is stacked on the lower cross posts between the upper side posts. The combination of the front and back bolsters of the rear cradle helps permit support of the load of the logs on the single main pole.

The side beams of the rear support frame each have an upwardly extending generally triangular upper pivot mount 42,43. The support beams of the rear cradle each have a downwardly extending generally triangular lower pivot mount 44,45. A first of the lower pivot mounts of the rear cradle is pivotally coupled by a pivot pin to a first of the upper pivot mounts of the rear support frame. A second of the lower pivot mounts of the rear cradle is pivotally coupled by a pivot pin to a second of the upper pivot mounts of the rear support frame. In use, the first and second lower pivot mounts of the rear cradle each are pivotable with respect to the associated lower pivot mount of the rear support frame about a substantially horizontally extending common second pivot axis extending substantially perpendicular to the longitudinal axis of the main pole such that the rear cradle is pivotable with respect to the rear support frame about the second pivot axis. Preferably, the first and second pivot axes are extended substantially parallel to one another.

A pair of biasing members 46,47 are interposed between the rear support frame and the rear cradle. One of the biasing members is positioned between a first of the side beams of the rear support frame and a first of the support beams of the rear cradle. The other of the biasing members is positioned between a second of the side beams of the rear support frame and a second of the support beams of the rear cradle. The biasing members are positioned adjacent the front cross brace of the rear support frame. In use, the biasing members bias the front bolster of the rear cradle away from the rear support frame. Preferably, the biasing members each comprise a compression spring.

The support beams of the rear support frame each has a upwardly extending stop 48,49. The stops are positioned adjacent the back cross brace of the rear support frame. The support beams of the rear cradle is rested on the stops of the rear support frame to space apart the back bolster of the rear cradle from the back cross brace of the rear support frame. The support beams of the rear cradle is extended substantially horizontal when resting on the stops.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trailer, comprising:

an elongate main pole having opposite front and back ends, and a longitudinal axis extending between said front and back ends of said main pole;

said front end of said main pole having a tongue adapted for attachment to a hitch of a towing vehicle;

a generally rectangular U-shaped front cradle being coupled to said main pole towards said front end of said main pole;

a generally open rectangular rear support frame being coupled to said main pole adjacent said back end of said main pole;

ground engaging wheels being rotatably mounted to said rear support frame to support said main pole above a ground surface;

a rear cradle being pivotally coupled to said rear support frame;

said rear cradle having spaced apart generally rectangular U-shaped front and back bolsters and a spaced apart pair of substantially parallel elongate support beams extending between said front and back bolsters of said rear cradle to connect said front and back bolsters of said rear cradle together;

said front and back bolsters of said rear cradle each comprising a spaced apart pair of generally vertically extending elongate upper side posts and a generally horizontally extending elongate lower cross post extending between the associated upper side posts of the respective bolster to connect the associated upper side posts together;

said rear cradle is pivotable with respect to said rear support frame about a pivot axis extending substantially perpendicular to said longitudinal axis of said main pole;

a pair of biasing members being interposed between said rear support frame and said rear cradle, said biasing members biasing said front bolster of said rear cradle away from said rear support frame; and wherein said rear support frame has a pair of upwardly extending stops, said rear cradle being rested on said stops of said rear support frame to space apart said back bolster of said rear cradle from said rear support frame.

2. The trailer of claim 1, further comprising a leg stand being coupled to said main pole adjacent said front cradle, said leg stand having an upper support member and a spaced apart pair of retractable legs downwardly depending from said upper support member of said leg stand, said legs of said leg stand being retractably extendable to rest on a ground surface below said main pole to support said main pole above the ground surface.

3. The trailer of claim 1, wherein said main pole has front and back portions, said front portion of said main pole being positioned adjacent said front end of said main pole, said back portion of said main pole being positioned adjacent said back end of said main pole, said front and back portions of said main pole being pivotally coupled together at a pivot point adjacent said leg stand.

4. The trailer of claim 1, wherein said rear support frame has a spaced apart pair of side beams and a spaced apart front and back cross braces extending between said side beams of said rear support frame to connect said side beams of said rear support frame together, said cross braces of said rear support frame being coupled to said main pole, said front cross brace of said rear support frame being positioned towards said front end of said main pole, said back cross brace of said rear support frame being positioned towards said back end of said main post.

5. The trailer of claim 4, wherein said side beams of said rear support frame each have an upwardly extending generally triangular upper pivot mount, wherein said support beams of said rear cradle each have a downwardly extending generally triangular lower pivot mount, wherein a first of said lower pivot mounts of said rear cradle is pivotally coupled to a first of said upper pivot mounts of said rear support frame, and wherein a second of said lower pivot mounts of said rear cradle is pivotally coupled to a second of said upper pivot mounts of said rear support frame.

6. The trailer of claim 1, wherein said biasing members each comprise a compression spring.

7. A trailer for carrying logs thereon, comprising:

a generally horizontally extending elongate main pole having opposite front and back ends, and a longitudinal axis extending between said front and back ends of said main pole;

said main pole having a generally circular transverse cross section taken substantially perpendicular to said longitudinal axis of said main pole;

said front end of said main pole having a tongue adapted for attachment to a hitch of a towing vehicle;

a generally rectangular U-shaped front cradle being coupled to said main pole towards said front end of said main pole;

said front cradle having a spaced apart pair of generally vertically extending elongate upper side members and an generally horizontal extending elongate lower cross member connecting said upper side members of said front cradle together;

said lower cross member of said front cradle being coupled to said main pole, said lower cross member of said front cradle being extended substantially perpendicular to said longitudinal axis of said main pole;

said upper side members of said front cradle being extended substantially parallel to one another and substantially perpendicular to said lower cross member of said front cradle;

a leg stand being coupled to said main pole adjacent said front cradle such that said front cradle is interposed between said leg stand and said front end of said main pole;

said leg stand having a generally horizontally extending elongate upper support member and a spaced apart pair of generally vertically extending retractable legs downwardly depending from said upper support member of said leg stand;

said upper support member of said leg stand being extended substantially perpendicular to said longitudinal axis of said main pole;

said upper support member of said leg stand and said lower cross member of said front cradle generally lying in a common horizontal plane with one another;

said legs of said leg stand being extended substantially parallel to one another and substantially perpendicular to said upper support member of said leg stand;

said main pole being interposed between said legs of said leg stand;

said legs of said legs stand being retractably extendable to rest on a ground surface below said main pole to support said main pole above the ground surface;

said main pole having front and back portions, said front portion of said main pole being positioned adjacent said front end of said main pole, said back portion of said main pole being positioned adjacent said back end of said main pole;

said front and back portions of said main pole being pivotally coupled together at a pivot point adjacent said leg stand such that said leg stand and said front cradle are interposed between said pivot point and said front end of said main pole;

said front and back portions of said main pole being pivotable at said pivot point about a first pivot axis extending substantially perpendicular to said longitudinal axis of said main pole between an extended position and a folded position;

wherein said front and back portions of said main pole are substantially collinear when positioned in said extended position, wherein said front and back portions of said main pole are extended at an angle less than about 180 degrees when positioned in said folded position;

a generally open rectangular rear support frame being coupled to said main pole adjacent said back end of said main pole;

said rear support frame having a spaced apart pair of substantially parallel side beams and spaced apart front and back cross braces extending between said side beams of said rear support frame to connect said side beams of said rear support frame together;

said cross braces of said rear support frame being coupled to said main pole, said front cross brace of said rear support frame being positioned towards said front end of said main pole, said back cross brace of said rear support frame being positioned towards said back end of said main post;

said side beams of said rear support frame being extended substantially parallel to said longitudinal axis of said main pole ground engaging wheels being rotatably mounted to said rear support frame to support said main pole above a ground surface;

a rear cradle being pivotally coupled to said rear support frame;

said rear cradle having spaced apart generally rectangular U-shaped front and back bolsters and a spaced apart pair of substantially parallel elongate support beams extending between said front and back bolsters of said rear cradle to connect said front and back bolsters of said rear cradle together;

said front and back bolsters of said rear cradle each comprising a spaced apart pair of generally vertically extending elongate upper side posts and a generally horizontally extending elongate lower cross post extending between the associated upper side posts of the respective bolster to connect the associated upper side posts together;

said lower cross posts of said front and back bolsters each being coupled to said support beams of said rear cradle, said lower cross posts of said front and back bolsters being extended substantially perpendicular to said longitudinal axis of said main pole;

said upper side posts of said front and back bolsters being extended substantially parallel to one another and substantially perpendicular to the associated lower cross post of the respective bolster;

said side beams of said rear support frame each having an upwardly extending generally triangular upper pivot mount;

said support beams of said rear cradle each having a downwardly extending generally triangular lower pivot mount;

a first of said lower pivot mounts of said rear cradle being pivotally coupled to a first of said upper pivot mounts of said rear support frame;

a second of said lower pivot mounts of said rear cradle being pivotally coupled to a second of said upper pivot mounts of said rear support frame;

said first and second lower pivot mounts of said rear cradle each being pivotable with respect to the associated lower pivot mount of the rear support frame about a substantially horizontally extending common second pivot axis extending substantially perpendicular to said longitudinal axis of said main pole;

said first and second pivot axes being extended substantially parallel to one another;

a pair of biasing members being interposed between said rear support frame and said rear cradle, one of said biasing members being positioned between a first of said side beams of said rear support frame and a first of said support beams of said rear cradle, the other of said biasing members being positioned between a second of said side beams of said rear support frame and a second of said support beams of said rear cradle;

said biasing members being positioned adjacent said front cross brace of said rear support frame;

said biasing members biasing said front bolster of said rear cradle away from said rear support frame;

said biasing members each comprising a compression spring;

said support beams of said rear support frame each having a upwardly extending stop, said stops being positioned adjacent said back cross brace of said rear support frame; and said support beams of said rear cradle being rested on said stops of said rear support frame to space apart said back bolster of said rear cradle from said back cross brace of said rear support frame.

8. A trailer, comprising:

an elongate main pole having opposite front and back ends, and a longitudinal axis extending between said front and back ends of said main pole;

said front end of said main pole having a tongue adapted for attachment to a hitch of a towing vehicle;

a generally rectangular U-shaped front cradle being coupled to said main pole towards said front end of said main pole;

a generally open rectangular rear support frame being coupled to said main pole adjacent said back end of said main pole;

ground engaging wheels being rotatably mounted to said rear support frame to support said main pole above a ground surface;

a rear cradle being pivotally coupled to said rear support frame;

said rear cradle having spaced apart generally rectangular U-shaped front and back bolsters and a spaced apart pair of substantially parallel elongate support beams extending between said front and back bolsters of said rear cradle to connect said front and back bolsters of said rear cradle together;

said front and back bolsters of said rear cradle each comprising a spaced apart pair of generally vertically extending elongate upper side posts and a generally horizontally extending elongate lower cross post extending between the associated upper side posts of the respective bolster to connect the associated upper side posts together;

said rear cradle is pivotable with respect to said rear support frame about a pivot axis extending substantially perpendicular to said longitudinal axis of said main pole; and wherein said rear support frame has a pair of upwardly extending stops, said rear cradle being rested on said stops of said rear support frame to space apart said back bolster of said rear cradle from said rear support frame.

9. The trailer of claim 8, further comprising a leg stand being coupled to said main pole adjacent said front cradle, said leg stand having an upper support member and a spaced apart pair of retractable legs downwardly depending from said upper support member of said leg stand, said legs of said leg stand being retractably extendable to rest on a ground surface below said main pole to support said main pole above the ground surface.

10. The trailer of claim 8, wherein said main pole has front and back portions, said front portion of said main pole being positioned adjacent said front end of said main pole, said back portion of said main pole being positioned adjacent said back end of said main pole, said front and back portions of said main pole being pivotally coupled together at a pivot point adjacent said leg stand.

11. The trailer of claim 8, wherein said rear support frame has a spaced apart pair of side beams and a spaced apart front and back cross braces extending between said side beams of said rear support frame to connect said side beams of said rear support frame together, said cross braces of said rear support frame being coupled to said main pole, said front cross brace of said rear support frame being positioned towards said front end of said main pole, said back cross brace of said rear support frame being positioned towards said back end of said main post.

12. The trailer of claim 11, wherein said side beams of said rear support frame each have an upwardly extending generally triangular upper pivot mount, wherein said support beams of said rear cradle each have a downwardly extending generally triangular lower pivot mount, wherein a first of said lower pivot mounts of said rear cradle is pivotally coupled to a first of said upper pivot mounts of said rear support frame, and wherein a second of said lower pivot mounts of said rear cradle is pivotally coupled to a second of said upper pivot mounts of said rear support frame.

13. The trailer of claim 8, further comprising a pair of biasing members being interposed between said rear support frame and said rear cradle, said biasing members biasing said front bolster of said rear cradle away from said rear support frame.

14. The trailer of claim 13, wherein said biasing members each comprise a compression spring.

* * * * *